United States Patent
Heller, Jr. et al.

[11] Patent Number: 6,010,803
[45] Date of Patent: Jan. 4, 2000

[54] METAL INJECTION MOLDED COVER FOR AN ELECTROCHEMICAL CELL

[75] Inventors: Bernard F. Heller, Jr., Fridley, Minn.; Scott E. Jahns, Hudson, Wis.; Daniel C. Haeg, Champlin, Minn.

[73] Assignee: Medtronic, Inc., Minneapolis, Minn.

[21] Appl. No.: 08/902,679

[22] Filed: Jul. 30, 1997

Related U.S. Application Data

[60] Provisional application No. 60/032,125, Dec. 5, 1996.

[51] Int. Cl.[7] .................................................. H01M 2/04
[52] U.S. Cl. .......................................... 429/175; 429/163
[58] Field of Search .................................... 429/181, 163, 429/171, 185, 72, 73, 180, 175, 176

[56] References Cited

U.S. PATENT DOCUMENTS

| | | | |
|---|---|---|---|
| 2,901,527 | 8/1959 | Macos . | |
| 4,467,021 | 8/1984 | Stocchiero | 429/175 |
| 4,748,094 | 5/1988 | Howard et al. | 429/90 |
| 5,104,755 | 4/1992 | Taylor et al. | 429/181 |
| 5,173,375 | 12/1992 | Cretzmeyer et al. | 429/72 |
| 5,209,994 | 5/1993 | Blattenberger et al. . | |
| 5,306,581 | 4/1994 | Taylor et al. | 429/181 |
| 5,439,760 | 8/1995 | Howard et al. | 429/94 |
| 5,458,997 | 10/1995 | Crespi et al. | 429/219 |
| 5,798,906 | 8/1998 | Ando et al. | 361/520 |

FOREIGN PATENT DOCUMENTS 683649  8/1979  U.S.S.R. .

OTHER PUBLICATIONS

R.M. German, *Powder Injection Molding*, Metal Powder Industries Federation, Princeton, NJ (1990), N/M available.

P. Johnson, "Powder Metal Gets Parts in Shape", *Design News*, pp. 89–90 (Jun. 26, 1995).

J.R. Merhar, "Metal Injection Molding: An Overview", *Medical Plastics and Biomaterials*, pp.24–28 (May/Jun. 1996).

"Metal Molding Maestros", *Injection Molding*, pp.86–89 (Aug. 1995).

"Powder Injection Molding Breaks New Ground", *Plastics Technology*, pp.15–17 (Aug. 1994).

"Powder Injection Molding: Cross–Fertilization at PIM '95", *Injection Molding*, pp.82–91 (Oct. 1995).

"Powder Injection Molding '96: Birth of an Industry", *Injection Molding*, pp.32–36 (Jun. 1996).

*Primary Examiner*—Maria Nuzzolillo
*Assistant Examiner*—Monique M. Wills
*Attorney, Agent, or Firm*—Thomas F. Woods; Harold R. Patton

[57] ABSTRACT

A cover for an electrochemical cell is molded by a metal injection molding process. The cover includes a main body portion completely integral with a feedthrough ferrule portion for accommodating an electrical lead to pass through the cover and/or completely integral with a fillport portion for introducing cathode material into the cell.

22 Claims, 8 Drawing Sheets

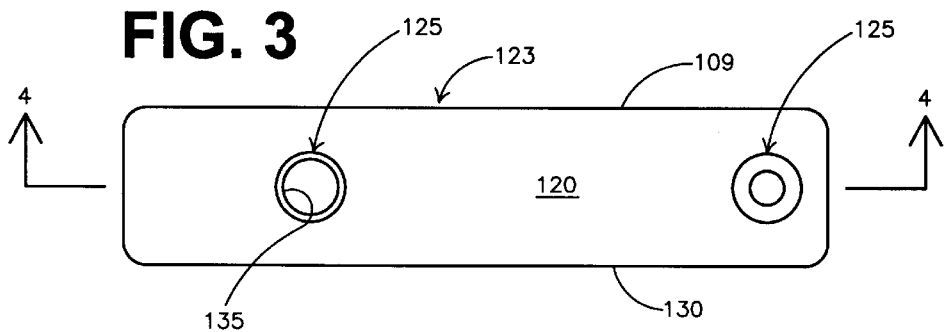
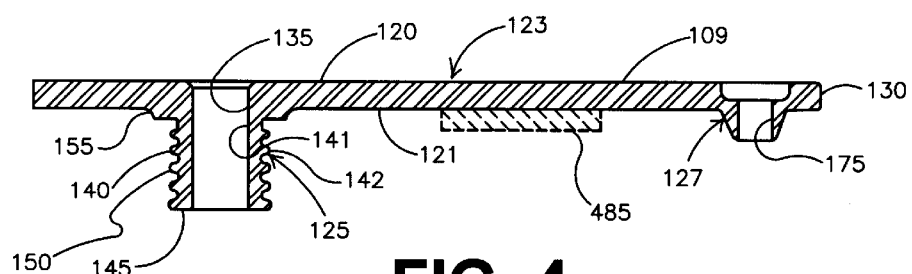
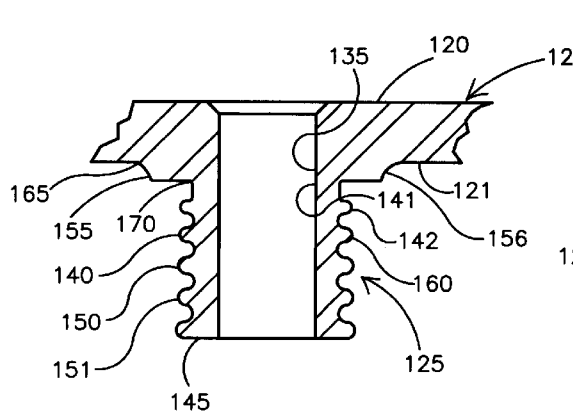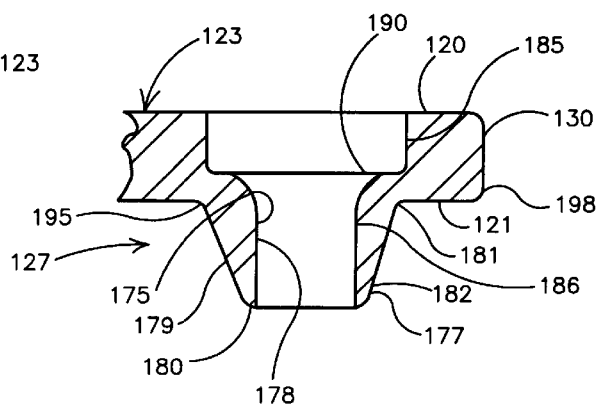

METAL INJECTION MOLDED COVER FOR AN ELECTROCHEMICAL CELL

CROSS-REFERENCE TO RELATED APPLICATIONS

This application claims the benefit of U.S. Provisional Application Ser. No. 60/032,125 filed Dec. 5, 1996.

FIELD OF THE INVENTION

The present invention relates to electrochemical cells. More particularly, the present invention pertains to covers of housings for electrochemical cells.

BACKGROUND OF THE INVENTION

General teachings concerning electrochemical cells may be found, for example, in U.S. Pat. No. 5,209,994 and U.S. Pat. No. 5,458,997 assigned to the assignee of the present invention. Electrochemical cells have found particular application in the medical field for use with heart pacemakers and other medical devices. Conventional cells, typically include a container with an open top which is closed by means of a lid or cover welded to the container to form a housing for the cell. The container and the cover are of electrically conductive material and serve as a contact for either the anode or cathode of the cell, e.g., a cathode current collector if the cell is a case positive cell such as described in U.S. Pat. No. 5,209,994 or an anode contact if the cell is a case negative cell such as described in U.S. Pat. No. 5,458,997. Inside the container is an anode/cathode assembly for use with the respective case positive or case negative cells. Further, the housing contains a material such as cathode material or electrolyte which is in contact with the cathode/anode assembly and the housing. A chemical reaction in the cell results in a voltage differential to generate electrical current to power a medical device.

Generally, the cover closes the container of the housing so that the contents of the cell are sealed therein. The housing must, however, provide access to the interior of the cell for at least two purposes. First, a lead connected to the anode or cathode current collector within the cell must pass from the interior of the cell to the space exterior of the cell. Second, cathode material or electrolyte must be filled into the housing. Conventionally, to accomplish such objectives, two holes are typically defined in the cover of the housing and structures are attached to the cover in association with these holes. For example, a "feedthrough ferrule" is attached to the lid to accommodate the electrical lead and a "fillport" is attached to the lid to accommodate the filling of cathode material or electrolyte into the cell.

In prior cell arrangements, the cover is formed by a generally rectangular blank stamped from a sheet of electrically conductive material. During the stamping, two holes are stamped through the blank. The feedthrough ferrule and the fillport are formed of discrete parts that are then welded to the generally rectangular blank, each in registration with one of the holes in the blank. Generally, the discrete feedthrough ferrule is formed by a relatively complicated machined ferrule and the fillport is formed of a drawn tubular member or may also be machined.

Table 1 below lists several U.S. Patents that describe electrochemical cells having containers with covers or lids that accommodate an electrical lead that passes through the cover and/or that have a fillport for filling cathode material or electrolyte into the cell interior:

TABLE 1

Prior Art Patents

| U.S. Pat. No. | Inventor(s) | Issue Date |
|---|---|---|
| 5,209,994 | Blattenberger et al. | May 11, 1993 |
| 5,104,755 | Taylor et al. | Apr. 14, 1992 |
| 5,173,375 | Cretzmeyer et al. | Dec. 22, 1992 |
| 5,306,581 | Taylor et al. | Apr. 26, 1994 |
| 5,439,760 | Howard et al. | Aug. 8, 1995 |
| 5,458,997 | Crespi et al. | Oct. 17, 1995 |

All patents listed in Table 1 above and all patents listed elsewhere herein are hereby incorporated by reference in their respective entireties.

Additionally, Table 2 below presents materials describing the manufacturing process of metal injection molding and are hereby incorporated by reference herein in their respective entireties:

Table 2: Prior Art Materials Regarding Metal Injection Molding

Article, "Metal Molding Maestros," *Injection Molding* (August 1995).

Article, "Powder Injection Molding: Cross-Fertilization at PIM '95," *Injection Molding* (October 1995).

Article, "Powder Injection Molding Breaks New Ground," *Plastics Technology* (August 1994).

Book, Randall M. German, *Powder Injection Molding*, Metal *Powder Industries Federation*, Princeton, N.J. (1990).

Article, "Metal Injection Molding" by Richard Drewes, *Product Design and Development* (November 1994).

As those of ordinary skill in the art will appreciate readily upon reading the Summary of the Invention, Detailed Description of the Embodiments, and claims set forth below, many of the devices and methods disclosed in Table 1 and Table 2 may be modified advantageously by using the teachings of the present invention.

SUMMARY OF THE INVENTION

The present invention has certain objects. That is, various embodiments of the present invention provide solutions to one or more problems existing in the prior art with respect to the cover of a container for a housing of an electrochemical cell. One such problem is that prior art covers have required a number of manufacturing, inspection, and assembly steps due to the use of at least three discrete parts, i.e. the rectangular blank, the feedthrough ferrule, and the fillport. Specifically, the rectangular blank is punched from a sheet of stainless steel using a fine blanking or stamping operation. Simultaneously, two through-holes are punched through the blank. The cover goes through an annealing, passivation (e.g., removal of free iron from the surface of the part) and cleaning process and then must be inspected. The discrete feedthrough ferrule (e.g., a feedthrough ferrule that has an outer surface that is circumscribed by rings) and the discrete fillport must each be inspected prior to attachment to the rectangular blank. The feedthrough ferrule and the fillport are then positioned in registration with the holes in the blank and are each welded to the blank. The two welds are vulnerable to variations in quality and each must be inspected. These numerous manufacturing, assembly, and inspection steps require time and labor which add to the cost of an electrochemical cell. Further, inventory of the three parts must be tracked and maintained, further adding to the cost of a cell.

Another problem with the prior art cover arrangement is crevice corrosion that occurs at the mating surfaces of the feedthrough ferrule and the fillport with the stamped holes in the cover. Typically, the feedthrough ferrule and the fillport are inserted from the bottom or interior surface of the blank and are welded either on the top or exterior surface of the blank or from the bottom or interior surface of the blank. Such welding may leave a crack or crevice between the mating surfaces leading to entrapment of materials such as cleaning solutions. As such, corrosion can occur around these crevices which can interfere with optimal performance of the cell.

Another problem with prior art covers is that additional design features cannot easily be incorporated without adding additional labor and inspection steps. For example, various elements such as brackets for attachment of leads may be welded to the cover in addition to the feedthrough ferrule and fillport. This leads to further manufacturing, assembly, and inspection steps which require time and labor and which add to the cost of an electrochemical cell.

Some embodiments of the invention include one or more of the following features: a feedthrough ferrule portion completely integral with a main body portion of a cover; a fillport portion completely integral with a main body portion of a cover; a cover having a completely integral main body portion, a feedthrough ferrule portion, and a fillport portion; weld grooves for concentrating heat energy at particular locations of the cover; interior or exterior surface projections completely integral with the main body portion of the cover for use in electrical wire bonding; interior or exterior projections completely integral for enhancing resistance welding of parts to the cover; spacers completely integral with the main body of the cover for centering the cover on a container; structural features for permitting easy insertion of the cover into a container; structural holding features completely integral with the main body of the cover for holding elements (e.g., closing button) in a position relative to the cover; structures of material completely integral with the main body portion of the cover for use as heatsinks (e.g., fins); and projections or depressions at the interior or exterior of the cover for attachment of elements to the cover.

In comparison to known covers for housings of electrochemical cells, various embodiments of the present invention may provide one or more of the following advantages: eliminating production steps such as stamping holes in a rectangular blank, machining a feedthrough ferrule, drawing or machining a fillport, annealing, and passivation; eliminating inspection of discrete feedthrough ferrules and fillports or other structures attached to the cover; eliminating welds between feedthrough ferrules and fillports to the main body of a cover; eliminating inspection of the welds; eliminating crevice corrosion occurring at mating surfaces of discrete parts; and providing additional features on a cover without significant additional manufacturing, inspection, and assembly steps, such as weld grooves for concentrating heat energy, surface projections for enhancing resistance welding of parts to a cover, spacers for centering a lid on a container, etc.

BRIEF DESCRIPTION OF THE DRAWINGS

FIG. 3 is an enlarged top elevational plan view of the cover shown in FIG. 2 according to the present invention.

FIG. 4 is a side view of the cover shown in FIG. 3, taken along line 4—4 of FIG. 3, with parts shown in cross-section.

FIG. 5A is a further enlarged cross-section view of a portion of the cover of FIGS. 3 and 4.

FIG. 6A is a further enlarged cross-section view of a portion of the cover of FIGS. 3 and 4.

DETAILED DESCRIPTION OF THE EMBODIMENTS

Figure 1:
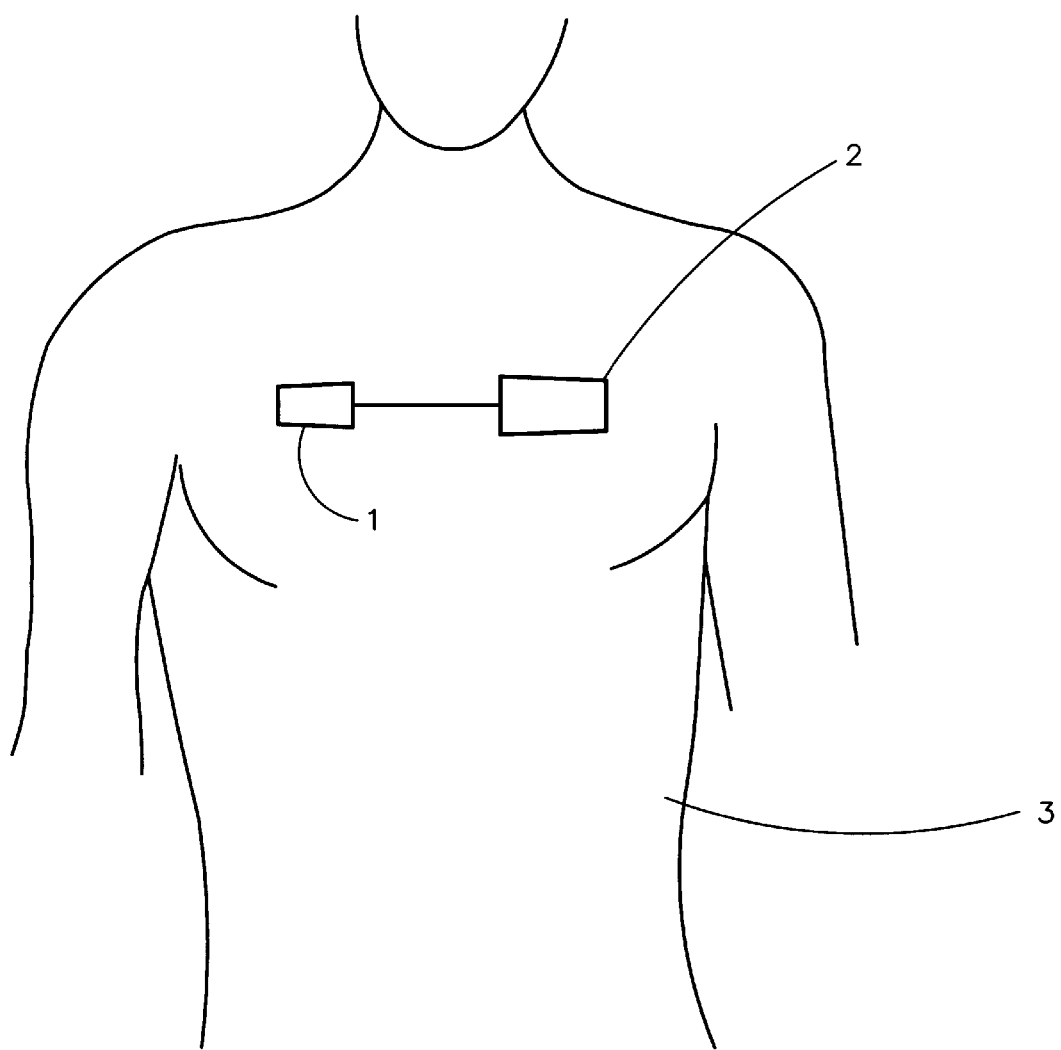
FIG. 1 is a schematic representation of an implantable medical device implanted inside a human body powered by an electrochemical cell.

Throughout the several figures and this Description, like reference numerals designate like elements. Further, throughout this Description, the words "top" and "bottom" are used for convenient reference to the orientation of the device as illustrated in the FIGS. and are not to be construed as limiting the invention to such an orientation.

Electrochemical cells 1, or batteries, generate electrical current from chemical energy. Such cells 1 have found widespread use as power sources for medical devices 2 such as heart pacemakers implanted in a human body 3, as illustrated in FIG. 1.

In accordance with the following description, it will be evident that the present invention is applicable to any electrochemical cell type in which a housing is used that has a container portion with an open side and a cover for closing the open side of the container forming a cavity of the cell. The invention is described below with reference to an illustrative lithium iodine cell configuration for simplicity purposes only; lithium iodine cells being representative of case positive low rate electrochemical cells. However, the present invention is clearly applicable to other electrochemical cells. For example, the present invention is applicable to low rate, medium rate, high rate, case negative, case positive or any other electrochemical cell. Examples of such cells include lithium iodine cells, lithium thionylchloride cells, lithium silver vanadium oxide cells, lithium carbon monofluoride cells, lithium manganese dioxide cells, etc.

It will further be recognized that such cells may take one of various configurations. For example, depending on the type of cell, the configuration of the anodes, cathodes, feedthrough ferrule portions, fillports, etc. will vary. Further, for example, depending on the type of cell, the type of material filled in the cavity of the housing will vary. Such material may take the form of a liquid or solid depending upon the type of cell. Therefore, it should be clear that the present invention is in no manner limited to the illustrative cell described herein, but that the metal injection molded cover in accordance with the present invention and the structural elements which can be provided with a single completely integral cover using metal injection molding are applicable to all types of electrochemical cells.

Figure 2:
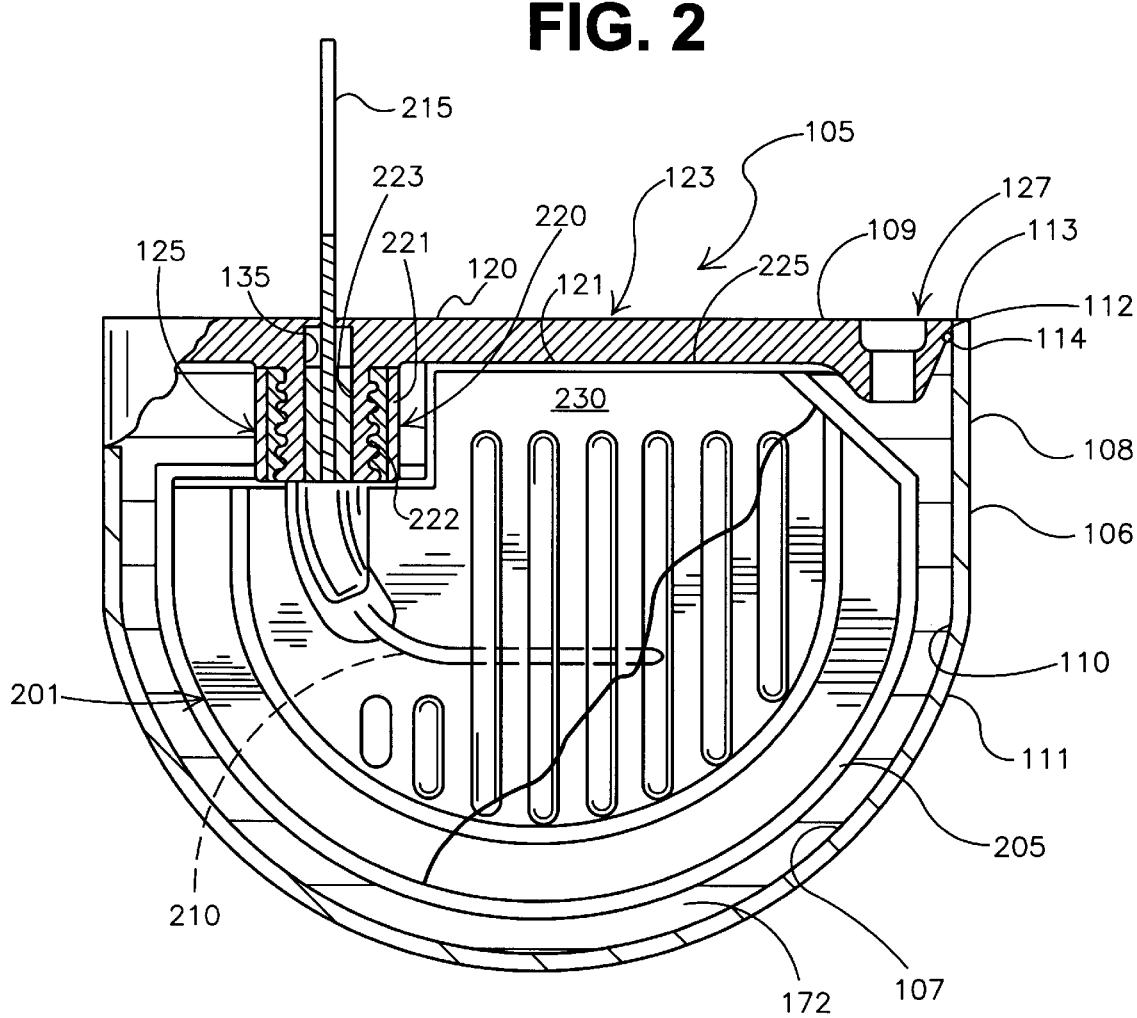
FIG. 2 is a front elevational view of an illustrative electrochemical cell including a cover according to the present invention with parts shown in cross-section.

FIG. 2 shows an illustrative electrochemical cell 105 incorporating a cover, i.e., lid, 109 according to the present invention. The cell 105 has a housing or container 106 made of metal, such as stainless steel, titanium or other suitable electrically conductive material. Housing or container 106 is formed of two portions: a bottom or container shell 108 and the cover 109. Bottom shell 108 has an interior surface 110 and an opposite exterior surface 111. Further, bottom shell 108 terminates in a peripheral region 112 at a peripheral edge or rim 113. Peripheral region 112 defines an open side or opening 114. That is, the bottom shell 108 forms generally all but one open side of housing 106. Cover 109 closes opening 114 and is attached to peripheral region 112, such as by welding.

FIGS. 3 and 4 show an illustrative embodiment of cover 109. Cover 109 is formed by metal injection molding of an electrically conductive material such as stainless steel, titanium, or other suitable conductive metal. Cover 109 has generally opposing major lateral surfaces 120 and 121. When in place on bottom shell 108 of housing 106, surface 120 is an exterior surface and surface 121 is an interior surface. Cover 109 is formed of generally three portions or regions: a main body portion 123, a feedthrough ferrule portion 125, and a fillport portion 127. Feedthrough ferrule portion and fillport portion 125 and 127 are completely integral with main body portion 123. Completely integral as used herein means being of a single continuous body of material. That is, by metal injection molding of cover 109, feedthrough ferrule portion and fillport portion 125 and 127 are not separate or discrete parts, but rather are completely integral with main body portion 123 forming a single part.

Cover 109 terminates at a peripheral edge 130. In the particular embodiment illustrated, main body portion 123 is generally rectangular in peripheral shape. It will be understood by one of ordinary skill in the art, however, that a cover or main body portion of a cover according to this invention may be of any suitable shape to mate with an opening in a bottom portion or shell of a housing, which may also be of any suitable shape. Therefore, the present invention contemplates any configuration of two portions of a housing which when mated form a cavity therein. Either one of such portions of the housing may include the feedthrough ferrule portion and fillport portion and be formed as a single part. As described above, such a housing may be used with any type of electrochemical cell and is clearly not limited to the illustrative embodiments shown and described herein but is limited only in accordance with the accompanying claims.

FIG. 5A shows an enlarged view of feedthrough ferrule portion 125. Feedthrough ferrule portion 125 defines a feedthrough passage 135. The feedthrough passage 135 extends through the cover 109 between the interior and exterior surfaces 121, 120. Feedthrough passage 135 accommodates an electrical lead 215 in an assembled cell 105, as shown in FIG. 2, allowing the lead to pass from the interior of the cell where it is connected to an anode to the exterior of the cell 105 where it can be connected to a device to be powered by the cell 105.

Feedthrough ferrule portion 125 includes a generally tubular member 140 having inner and outer surfaces 141, 142 and terminating at a tube end 145. Tubular member 140 extends from the interior surface of the main body portion 123. A ringed portion 150 of tubular member 140 that is generally proximate tube end 145 has a number of coaxial rings 151 longitudinally spaced along its outer surface 142.

Coaxial rings 151, covered with insulator portion 220 as shown in FIG. 2, provide a lengthened path to reduce the possibility of cathode material undesirably reaching the anode current collector 210 of the cell. Feedthrough ferrule portion 125 further includes a shoulder member or flange 155. Flange 155 is used to facilitate alignment of the cover during glassing, for alignment of the cover during molding of the insulating material 222 on the rings 151, for use as a shut-off during the metal injection molding process, etc.

It should be readily apparent to one skilled in the art that various electrochemical cells may have multiple feedthrough ferrule portions molded in the cover to accommodate connection of multiple components in the cell to the exterior of the cell. Further, various cells because of the anode/cathode components used therein will not require the various features as shown in feedthrough ferrule portion 125 (e.g., coaxial rings). As such, it should be recognized that depending upon the type of cell being produced, the various elements of the cell cover will change. For example, in a case negative cell such as described in U.S. Pat. No. 5,458,997, the feedthrough ferrule portion may be relatively simple for connection of a cathode connection tab to the exterior of the cell with the anode connection tab being connected to the housing. As described further below, structure for connecting an anode tab to the cover (e.g., a bracket completely integral with a main body portion of a cover) may be formed in accordance with the present invention.

Shoulder member or flange 155 of feedthrough ferrule portion 125 has a generally cylindrical outer surface 156 that has a radius greater than the radius of the outer surface 160 of the rings 151 of tubular member 140. The molded juncture or intersection 165 between shoulder member 155 and the main body portion 123 of cover 109 is curved slightly or "radiused," rather than squared, to facilitate the flow of material during the cover metal injection molding process and to eliminate areas of stress concentration which can cause the molded material to crack. Similarly, the molded juncture or intersection 170 between the ringed portion 150 and the shoulder member 155 is slightly curved or "radiused," rather than squared, to facilitate the flow of material during the cover molding process and to eliminate areas of stress concentration which can cause the molded material to crack.

Figure 5B:
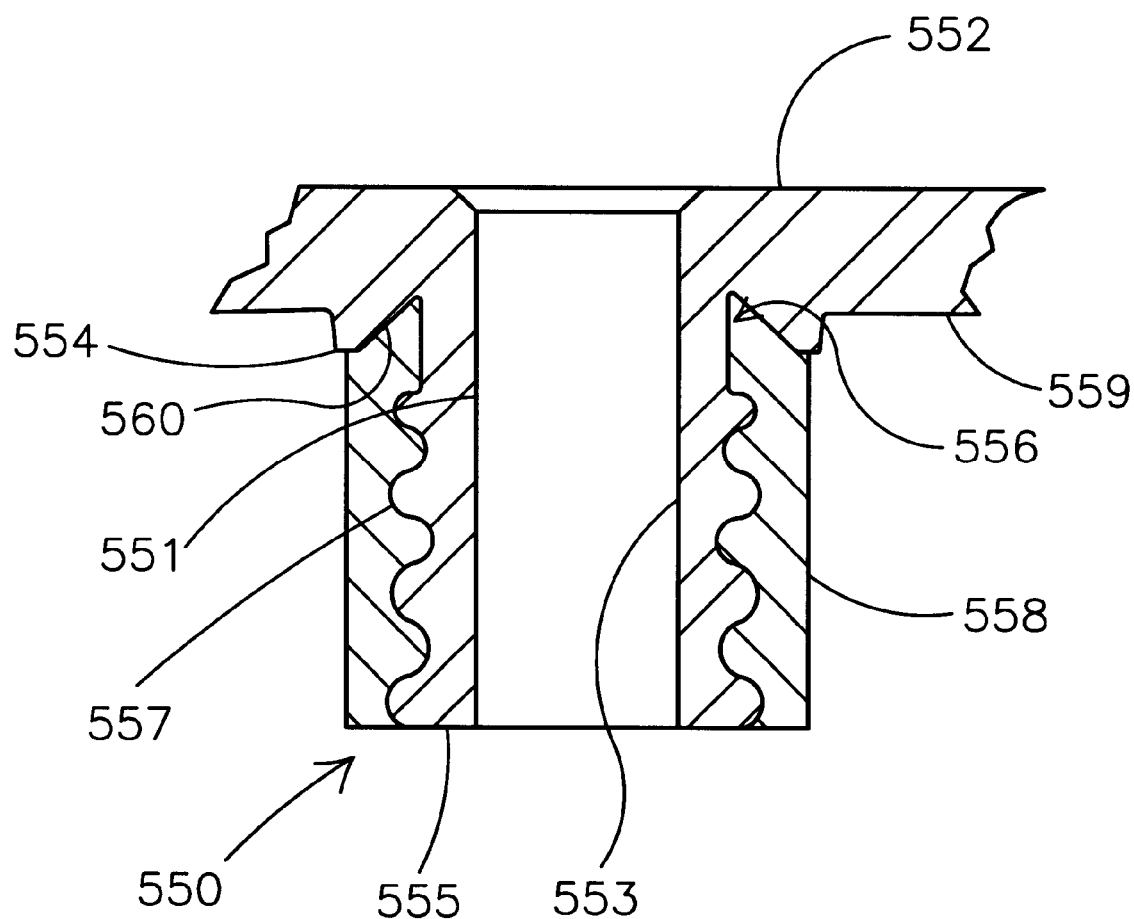
FIG. 5B is an alternate configuration for the portion of the cover shown in FIG. 5A.

FIG. 5B shows an alternate feedthrough ferrule portion 550 for a cover 554. Feedthrough ferrule portion 550 includes a generally tubular member 551 having inner surface 553 terminating at a tube end 555. The tubular member 551 also includes an outer ring containing surface 557. Feedthrough ferrule portion 550 further includes a shoulder member or flange 554 which extends from the main body portion 559. An interlocking notch 556 is formed between the flange 554 and tubular member 551. In one specific embodiment of the notch 556, the flange includes a tapered flange inner surface 560 which intersects the tubular member 551 to form the notch 556. Interlocking notch 556 locks the insulator 558 in place about the ringed outer surface 557 such that an additional metal sleeve, such as metal sleeve 221 as shown in FIG. 2, is not required to hold the insulator in place.

FIGS. 4 and 6A show fillport portion 127 of cover 109. When cover 109 is welded to the bottom shell 108, fillport portion 127 is used to allow cathode material 172 (shown in FIG. 2) to be filled into the interior of the cell 105. Fillport portion 127 defines a fill passage 175. The fill passage 175 extends through the cover 109 between the interior and exterior surfaces 120,121. Fillport portion 127 includes a generally tubular member 177 having an inner surface 178 and an outer surface 179. Tubular member 177 extends from the main body portion 123 and terminates at end or edge 180. Outer surface 179 is generally conical, tapering from a wider or thicker section 181 proximate the main body portion 123 to a narrower section 182 proximate the end 180 of the tubular member 177. Generally, the molding material flows best from thick to thin sections. This tapered shape also acts as a "draft" which aids in the release or removal of the molded part from the mold.

Inner surface 178 is generally cylindrical and includes two sections 185, 186 of different diameter. The seating section 185 for receiving and seating a closing button (not shown) therein has a larger diameter than the narrower section 186. A shoulder or seat 190 is formed by the transition from the wide seating section 185 to the narrower section 186. The shoulder 190 may be used for seating the closing button or for seating a device for filling the interior of the cell 105, such as a filling funnel. The juncture or intersection 195 between the main body portion 123 and the conical tubular member 177 of the fillport portion 127 is slightly curved or "radiused" to facilitate the flow of material during the cover metal injection molding process and to eliminate areas of stress concentration.

Figure 6B:
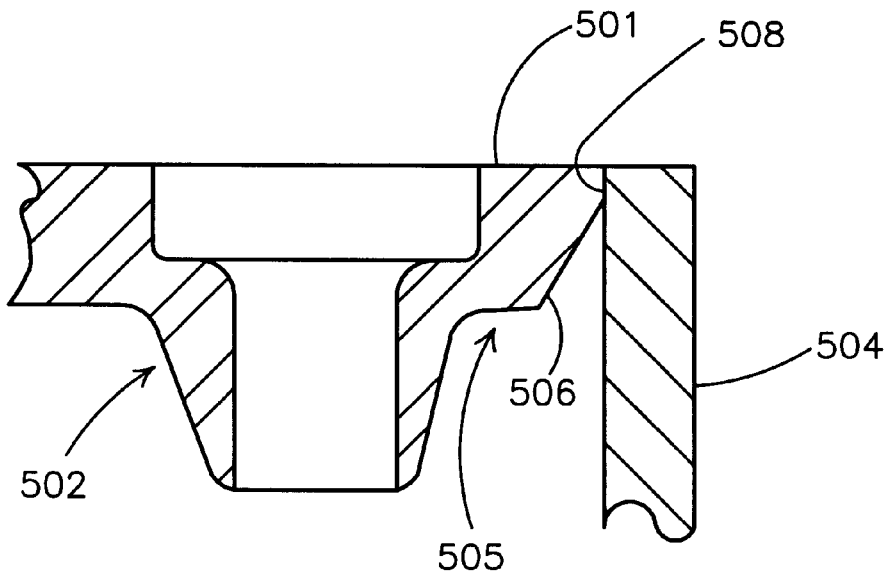
FIG. 6B is an alternate configuration for the portion of the cover shown in FIG. 6A.
Figure 6C:
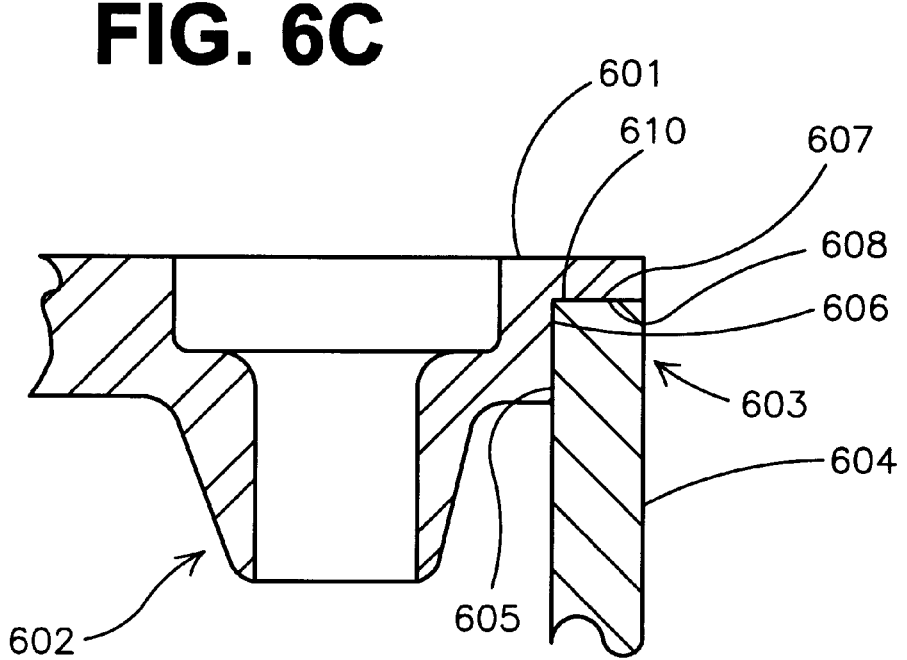
FIG. 6C is an alternate configuration for the portion of the cover shown in FIG. 6A.

As shown in FIGS. 6A–6C, the bottom corner of the peripheral edge of the cover can be molded in various different configurations using the injection molding process. FIG. 6A illustrates a curved corner 198 joining the peripheral edge 130 and the interior surface 121 of the main body portion 123. This curved corner 198 facilitates the insertion of the cover 109 in the opening 114 of the bottom shell 108 of the cell 105, and is easily achieved during the molding of the cover 109.

Alternatively, as shown in the configuration of FIG. 6B, cover 501 includes a chamfered bottom corner 505 of the peripheral edge 508 of cover 501 (i.e., the edge or corner being formed to a desired angle). The chamfered surface 506 extends inward from the peripheral edge (e.g., towards the opening of fillport portion 502 from peripheral edge surface 508) such that the cover 501 can be easily inserted into container 504 with a tight fit between the container 504 and surface 508. It should be readily apparent to one skilled in the art that the configuration of this corner may be of any modified form allowing for ease of insertion of the cover into a respective container (e.g., reducing the force necessary to press fit the cover into the container). For example, the modified corner can be a beveled edge, a radiused corner having a radii greater than achievable with die roll in a stamping process, an angled edge, a multiple angled edge, etc.

Further, as shown in the alternate configuration of FIG. 6C, the bottom corner of the cover 601 is a step structure 603. The stepped structure 603 includes a peripheral edge surface 607. Extending inward from the peripheral edge surface 607 (e.g., towards the opening of fillport portion 602) is a first step surface 608 with a second step surface 606 extending substantially perpendicular from the first surface 608. The stepped structure 603 is sized so that the first step surface 608 abuts the peripheral edge surface 610 of container 604 and the second step surface 606 abuts a surface portion 605 of container 604 adjacent the peripheral edge surface 610 of the container 604.

As shown in the illustrative embodiment of FIG. 2, and noted above, cover 109 is received in the open side or opening 114 in bottom shell 108. FIG. 2 further shows the remainder of the contents of the illustrative electrochemical cell 105. The cell 105 has an anode assembly 201 formed by two lithium plates 205 pressed together with a current collector 210 embedded therein. Current collector 210 may be an extension of electrical lead 215 and may be, for example, a thin pin of nickel or stainless steel. Electrical lead 215 is of sufficient length to extend out of housing 106 for making an external electrical connection thereto. Lead 215 passes through the passage 135 defined by feedthrough ferrule portion 125. Feedthrough passage 135 is filled with a non-conductive material 223, such as glass or plastic, which surrounds the lead 215 to preclude it from contacting the interior surface 141 of the feedthrough ferrule portion 125. Insulator portion 220, includes a nonconductive material 222, such as a fluoropolymer, which surrounds and mechanically interlocks with the rings 151 of the feedthrough ferrule portion 125. The insulator portion 220 may further include a metal sleeve 221 to hold the material 222 in position.

The anode arrangement or assembly 201 is electrically insulated from cover or lid 109 by a band 225 of electrically non-conductive material. The band 225 peripherally encloses the anode assembly 201 in this particular embodiment. However, any band configuration may be used. Band 225 is preferably of a fluoropolymer material or any similar material which is nonreactive with the contents of the cell. In this particular band configuration, the opposite ends of band 225 are provided with apertures of a size sufficient to receive part of the insulator portion 220. These ends are overlapped adjacent the insulator portion 220 to provide a wrap-around structure. The lithium plates 205 are typically coated with a film 230 of polymeric organic donor material, such as poly (2-vinylpyridine). The polymeric material may take the form of a perforated film covering the operative or opposed lateral surfaces of lithium plates 205.

Figure 7:
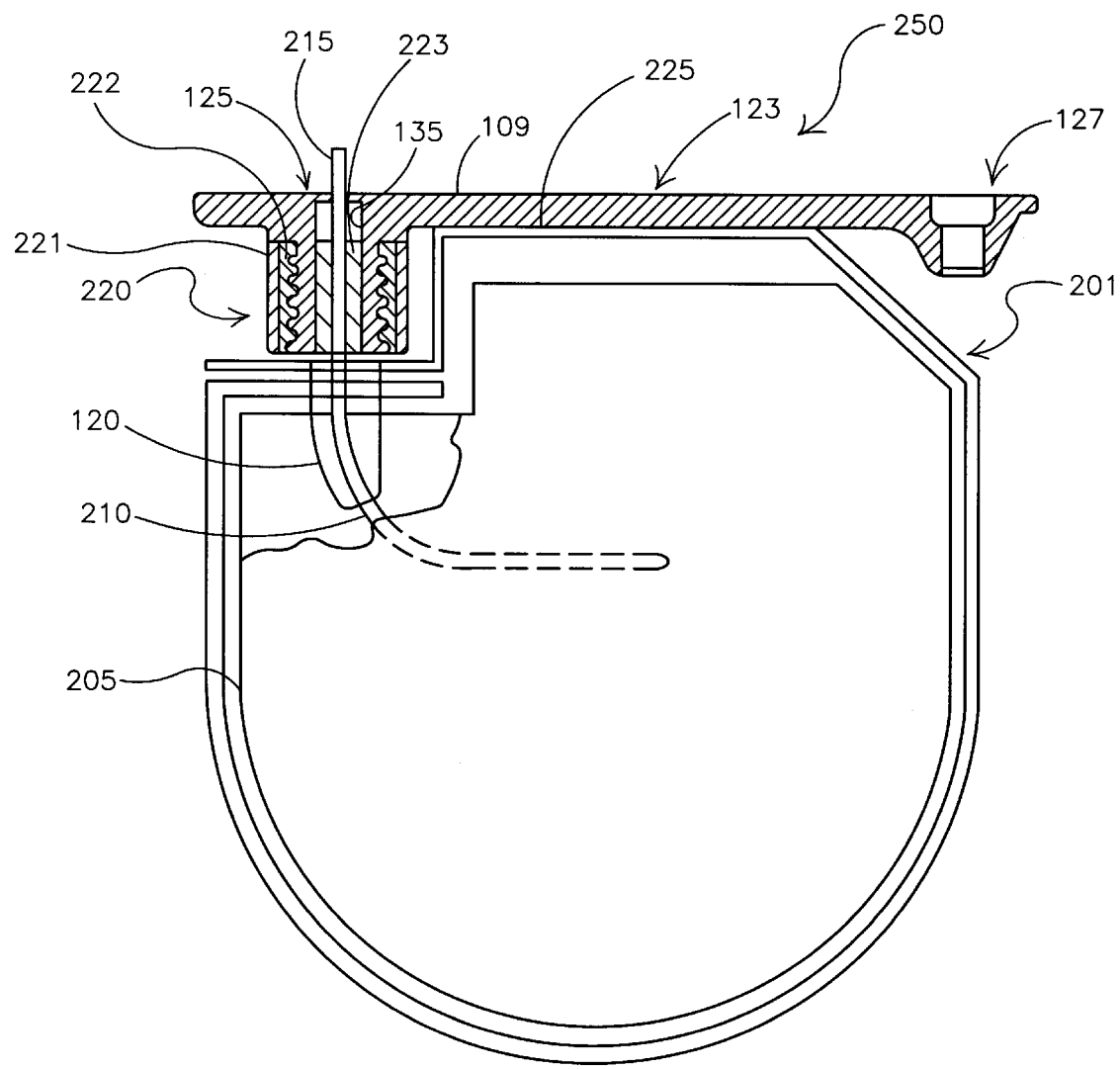
FIG. 7 is a side elevational view of an anode-and-lid subassembly for an electrochemical cell incorporating the cover illustrated in FIGS. 3 and 4.

FIG. 7 shows an anode-and-lid subassembly 250 that forms part of cell 105. Subassembly 250 includes the anode assembly 201, the cover 109, insulator portion 220, and insulator band 225. The cover 109 includes main body portion 123, feedthrough ferrule portion 125, and fillport portion 127. As noted above, the anode assembly 201 includes lithium plates 205 with current collector 210 embedded therein. A part 120 of insulator portion 220 is also sandwiched between or embedded in lithium plates 205. Insulator band 225 extends along the peripheral edge of the lithium plates 205 forming a barrier between the anode arrangement 201 and the cover 109 to preclude electrical contact therebetween. Lead 215 extending from the current collector 210 passes through the passage 135 defined by the feedthrough ferrule portion 125, such that lead 215 extends to the exterior of the cell. The lead 215 is positioned in the passage 135 by an insulating material 223, such as glass.

In operation, housing 106 of cell 105, as shown in FIG. 2 being of electrically conductive material, serves as a cathode current collector in direct contact with the cathodic material 172. Consequently, an electrical lead (not shown) may be attached directly to the exterior of housing 106 for cathodic contact. Another electrical lead can be connected to the electrical lead 215 to make electrical contact with the anode arrangement 201. A chemical reaction between the lithium plates 205 and the cathode material 172 in housing 106 causes electrons to flow into the current collector 210. A chemical reaction between the cathode material 172 and the housing 106 causes the housing 106 to be positively charged. The resulting voltage differential across the cell 105 can be used power a device.

It should be readily apparent to one skilled in the art that the contents of the cell will vary dramatically depending upon the type of cell (e.g., case positive, case negative, high rate, low rate, the types of connections of the anode/cathode assembly being used, the types of cathode material or electrolyte being used, etc.). However, in all such cells at least one lead must be fed through the cover to the exterior space. As such, the present invention is not limited to any particular cell contents, such as a flat wrapped anode/cathode assembly, a pressed lithium anode assembly, or any other particular contents generally located within the cell. Rather, the present invention provides a metal injection molded cover for facilitating electrical connection of a variety of cell contents to harness the power of the cell. Such connections may be facilitated by the ability to provide a variety of design features into the cover through metal injection molding of the cover as described below, in addition to providing an integral feedthrough ferrule portion for the at least one lead fed through the cover to the exterior space.

By molding the cover incorporating the feedthrough ferrule portion and fillport portion, various manufacturing, inspecting, and assembly costs are reduced. Further, by metal injection molding the cover, a number of design features can be easily included without adding manufacturing, inspecting, assembling labor, and time. For example, various depressions or projections can be molded onto the cover for external wire-bonding (e.g., connection of a lead to the housing), for internal anode or cathode connection or attachment (e.g., connection of an anode connection tab to the housing as described in U.S. Pat. No. 5,458,997), for enhanced welding, etc., as further described below.

Figure 8:
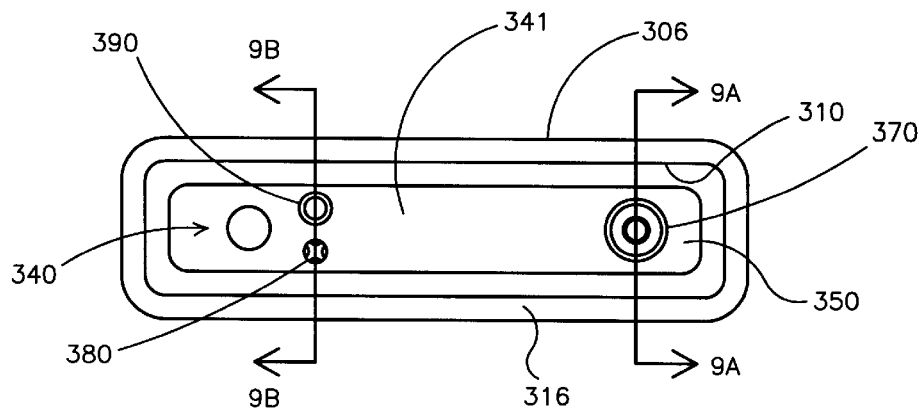
FIG. 8 is a top elevational schematic view of an alternate embodiment of a cover according to the present invention incorporating various structures completely integral with or defined in the main body of the cover.

FIGS. 8–11 show various advantageous design features that can be molded into a cover according to the present invention using metal injection molding. A first alternate embodiment of a cover 306 for an electrochemical cell is illustrated schematically in FIGS. 8 and 9A–9B and shows a variety of such advantageous design features. The cover 306 includes one or more depressions molded therein to enhance the welding of the cover to the container or other elements to the cover. For example, as shown in FIGS. 8 and 9A–9B, the cover 306 includes a weld groove 310 defined therein for enhancing the welding of the cover 306 to bottom shell 307 of a cell housing 308. As shown in FIG. 8, weld groove 310 follows or parallels the peripheral edge 315 of cover 306 at a predetermined distance from the edge. The distance and depth of the weld groove is at least in part dependent on the thickness of the shell 307 and thickness of the cover 306. Preferably, the distance of the groove 310 from the peripheral edge is substantially equivalent to the thickness of the shell 307. For example, the distance may be between about 0.005 inches (0.127 mm) and 0.020 inches (5.08 mm) and the groove may have a depth of between about 0.010 inches (0.254 mm) and 0.020 inches (5.08 mm). Peripheral region 316 is defined between the groove 310 and the peripheral edge 315 of the cover 306.

Figure 9A:
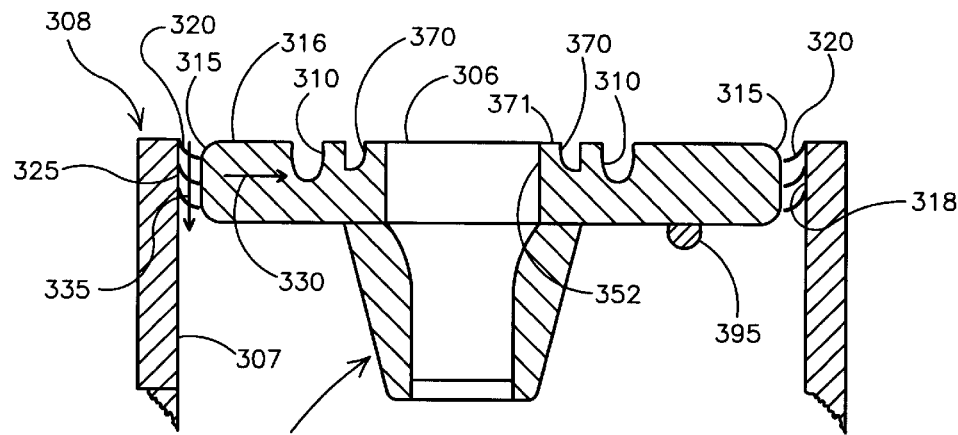
FIG. 9A is an enlarged side schematic view of the cover of FIG. 8, taken along line 9A—9A in FIG. 8, mounted in a container for an electrochemical cell, with parts shown in cross-section.

Also as shown in FIGS. 8 and 9A, a weld groove 370 may be defined in main body portion 341 of cover 306 at a predetermined distance from an inner surface 352 defining the opening of fillport portion 350. The groove 370 results in a region 371 lying between the fillport opening and the weld groove 370.

Figure 9B:
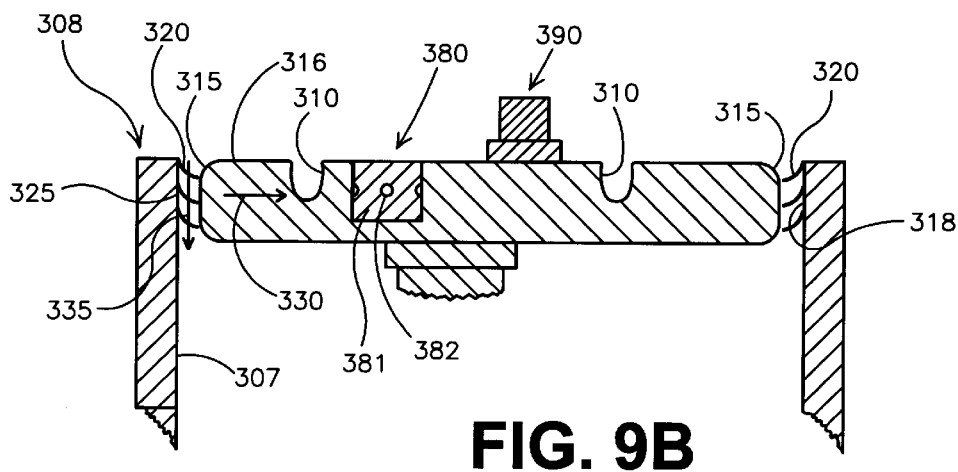
FIG. 9B is an enlarged side schematic view of the cover of FIG. 8, taken along line 9B—9B in FIG. 8, mounted in a container for an electrochemical cell, with parts shown in cross-section.

As shown in FIGS. 8 and 9A–9B, the cover 306 is placed into an open side or opening 318 of bottom shell 307 of the housing 308. Only a portion of bottom shell 307 is shown in FIGS. 9A–9B. It will be understood by those of ordinary skill in the art that the remainder of the housing 308 and the contents of the cell may be substantially similar to that illustrated in and described above with respect to FIGS. 2–6 or may be any other suitable configuration. A weld 320 is placed between the peripheral edge 315 of cover 306 and a peripheral edge region 325 of the bottom shell 307 of the housing 308. The groove 310 inhibits heat transfer away from the site of welding, thereby obtaining an equivalent weld with lower temperature requirements. That is, the coefficient of heat transfer of the air in groove 310 is lower than the coefficient of heat transfer of the metal material forming the cover 306. Heat applied to the weld is conducted away from the weld generally in the direction indicated by arrow 330 and "runs into" the air of the groove. Because the heat is conducted less quickly into the air of the groove 310, it is retained or concentrated in the peripheral region 316 between the groove 310 and the peripheral edge 315 of the cover 306 lowering the temperature requirements to perform the weld relative to a weld performed without the groove 310. The weld groove 370 allows a closure button (not shown) to be welded in the upper region of the fillport portion 350 at lower temperatures due to the concentration of heat in the region 371.

Also shown in FIGS. 8 and 9A–9B are various projections completely integral with and extending from the main body portion 341 and other depressions defined in the main body portion 341 during the metal injection molding of the cover 306. Projection 390 is generally representative of projection attachment structures (e.g., a connector plug, a lead for welding to a connector, etc.) which could be molded with the main body portion 341. Depression 380 is generally representative of depression attachment structures (e.g., a socket) which could be defined in the main body portion 341. Such projections may be of various sizes and shapes and for various purposes. For example, as shown in depression 380 which may include a socket cavity 381 for receiving a plug therein, the surface defining the cavity may include holding structures 382, e.g., bumps, for holding a plug therein.

It should be readily apparent that such projection structures and/or depression structures may be formed relative to either the exterior surface of the cover or the interior surface of the cover. For example, the projection may take the form of a weld projection 395 used to attach a lead or other structural element to the cover, e.g. an anode connection tab such as in a case negative design. Such a weld projection allows heat to be concentrated at the point of attachment as opposed to allowing heat to be transferred into a larger portion of the main body portion of the cover.

The feedthrough ferrule portion 340 and the fillport portion 350 of cover 306 is illustrated schematically in FIGS. 8 and 9A–9B. Details regarding the feedthrough ferrule and fillport portions 340, 350 will be understood with reference to the other embodiments illustrated in, and described above with respect to FIGS. 2–6.

Figure 10:
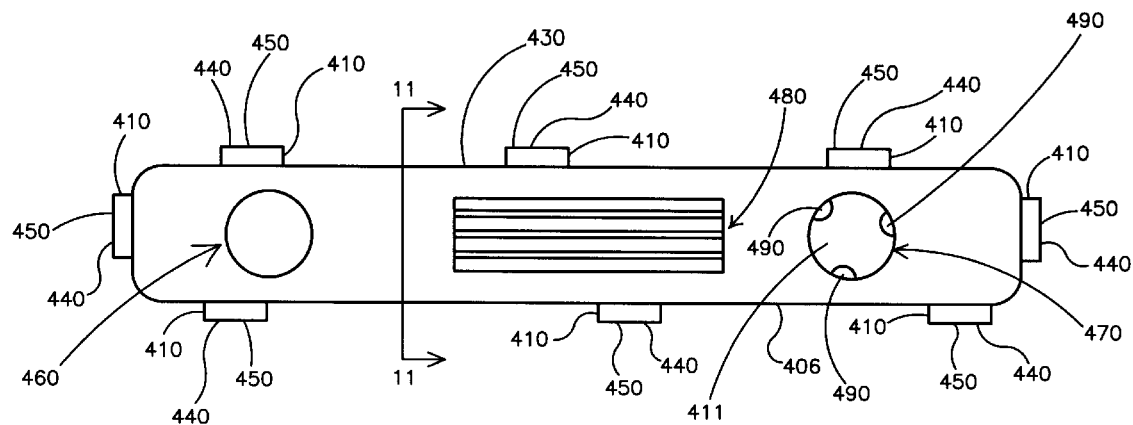
FIG. 10 is a top elevational schematic view of an alternate embodiment of a cover according to the present invention incorporating various structures completely integral with the main body of the cover.
Figure 11:
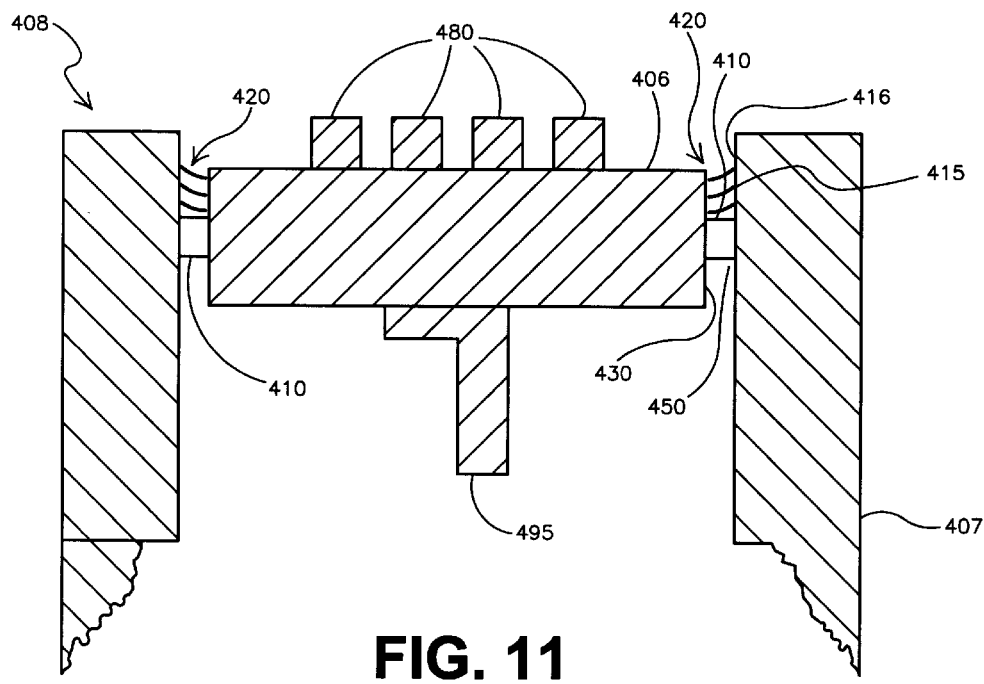
FIG. 11 is an enlarged schematic side view of the cover of FIG. 10, taken along line 11—11 in FIG. 10, mounted in a container for an electrochemical cell with parts shown in cross-section.

FIGS. 10 and 11 schematically illustrate another alternate embodiment of a cover 406 for an electrochemical cell housing 408 including various other design features which can be integrally molded in the cover during the metal injection molding process. Cover 406 includes spacing elements or spacers 410 (i.e., projections extending from the peripheral edge 430 of the cover 406) which assist in the centering of the cover 406 in the bottom shell 407 of the housing 408 and also allow for ease of insertion of the cover 406 into the shell 407. As the cover 406 is generally press fit into the shell 407, the spacers reduce the amount of force required to insert cover 406 into shell 407. More specifically, bottom shell 407 terminates in a peripheral edge region 415 which defines an opening 416 into which the cover 406 is received. Generally, the cover 406 is slightly smaller than the opening 416 to accommodate a weld 420 between the peripheral edge 430 of the cover 406 and the peripheral edge region 415 of the bottom shell 407. For sealing of the cover 406 to the bottom shell 407, cover 406 is preferably centered in the opening 416, with substantially equal clearance or gap around the entire peripheral edge 430 of the cover 406.

The embodiment illustrated in FIG. 10 includes eight spacers 410 intermittently spaced along and extending generally outward from the peripheral edge 430 of the cover 406. Each spacer 410 is a generally rectangular tab. The spacers 410 are completely integrally molded with the cover 406. Generally, the outer edges 450 of the spacers 410 abut the peripheral edge region 415 of the bottom shell 407. The weld 420 is then placed along the peripheral edge 430 of the cover 406 between the cover 406 and the peripheral edge region 415 of the bottom shell 407. It will be understood by those of ordinary skill in the art that any number of spacers 410 of any size and shape may be used within the scope of this alternate embodiment of the invention.

Further, the cover 406 shown in FIGS. 10 and 11 includes various projections 480 which serve as heat sinks. The projections 480 take the form of a fin type heat sink having a plurality of fins for increasing the surface area of the heat sink. Further, for example, as shown in FIG. 4, additional heat sink material 485 may be added at the interior surface 121 of the main body portion 123 to provide localized heatsinking at the anode assembly location. It should be readily apparent that heatsinks may be added in such a manner to any location of the cover to provide localized heatsinks for any sensitive components of the cell.

Yet further, FIG. 10 shows holding projections 490 extending into the fillport opening for holding a closure button (not shown) in place during welding. Further, FIG. 11 includes a bracket projection 495 for attachment of an interior component of the cell, for example, an anode or cathode collector structure such as described in U.S. Pat. No. 5,458,997.

The feedthrough ferrule portion 460 and the fillport portion 470 of cover 406 is illustrated schematically in FIGS. 10 and 11. Details regarding the structure of feedthrough ferrule and fillport portions 460, 470 will be understood with reference to the embodiments illustrated in, and described above with respect to, FIGS. 2–6.

It should be readily apparent that any one or more of the design features described herein may be used in any combination with any particular cover configuration. With use of the metal injection molding process to provide a cover, such design features can be incorporated without substantial cost. For example, projections may be used for external wire bonding of a lead to a housing in combination with an additional projection used for internal anode connection to the housing, e.g., bracket 495. Further, for example, a weld groove about the periphery of the device may be used in combination with locking projections in the fill port opening for holding the closure button therein. One would recognize that the number of combinations are too numerous to describe, that the present invention is not limited by or to any particular illustrative combination described herein, but that the present invention is limited only according to the accompanying claims.

A method of making or forming a cover or lid for an electrochemical cell by metal injection molding is also described herein. In general, the metal injection molding process begins by designing and making a suitable mold. Next, metal particles generally having spherical shapes with a nominal diameter of less than about 25 microns are mixed with a binder which may be a blend of polymers, wax and other materials. A thermal mechanical process is used to mix the combination of about 40% binder and about 60% metal particles. The mixture is then pelletized and injected into a mold. This produces a "green part" which is typically about 19–25% larger than the finished product. The green part is then subjected to a debinding process where about 90% of the polymer binding material is removed through thermal, solvent, or catalytic reactions. The resulting "brown part" is then sintered by heating it to about 96% of the melting point for the metal used in the process. Sintering shrinks the brown part by about 17–22% to nearly full density. The product is then complete with no further annealing steps being required.

In one illustrative method of the present invention, a cover or lid 109 is produced through the process of metal injection molding, where the mold produces feedthrough ferrule and fillport portions 125, 127 completely integral with main body portion 123 of the cover 109 and provides for any other design features as desired. The preferred cover 109 includes formed junctures 165, 170, 195 to facilitate the flow of material during the mold process and to reduce stress concentration. In the preferred method, a material commercially available from BASF Corporation (Wyandotte, Mich.) is used for the metal injection process. Preferably, the material is 316L stainless steel which has been pelletized. However, other preferred materials include 316, 304L, and 304 stainless steel. The pellatized material is mixed with a binder in a debinding system called catalytic debinding which yields covers that are particularly dimensionally stable; the debinding system is available from Phillips Origen Powder Metal Molding (Menomonie, Wis.). The molding is performed on a conventional molding press used for injection molding plastics, but with an altered profile on the screw. The mold is run hot to increase the flow rate of the material. Hot oil is used to heat the mold. The mold is preferably equipped with pressure transducers to indicate the pressure in the mold cavity and to thereby adjust molding parameters accordingly. The "green" cover undergoes debinding in a gas-tight oven at about 110°–140° C. in a nitrogen atmosphere containing a few percent of gaseous nitric acid. The "brown" cover is then sintered in an atmosphere controlled high temperature oven.

It should be readily apparent that various metal injection molding processes may be used to produce the cover according to the present invention. The process described above is for illustrative purposes only.

The present invention is also directed to a method of assembling an electrochemical cell incorporating a metal injection molded cover with a completely integral feedthrough ferrule portion and fillport portion. As shown in FIGS. 2 and 7, an anode arrangement 201 is connected to a cover 109 in a subassembly 250, with the current collector 210 of the anode arrangement 201 extending through the feedthrough ferrule portion 125 of the cover. The feedthrough passage 135 is filled with glass surrounding the electrical lead 215. Insulator portion 220 is interlocked with the rings of the feedthrough ferrule portion 125 and positioned about a portion of current collector 210. This configuration is then placed in a die and the lithium plates 205 are pressed with sufficient force to cause the plates 205 to cohere to each other. The subassembly 250 is then inserted into bottom shell 108 of housing 106 with the anode arrangement 201 spaced from the inner surface of the housing 106. The cover 109 is welded to the bottom shell 108. Cathode material 172 is poured into the cavity defined by the housing 106 through the fillport passage 175. The cathode material 172 operatively contacts the exposed surfaces of the lithium plates 205. The amount of cathodic material 172 in the housing 106 is preferably sufficient to contact the exposed lateral surfaces of lithium plates 205 and to reach a level at or adjacent the interior surface 121 of lid 109. The fillport passage 175 is sealed with a closing button (not shown), such as by welding.

The preceding specific embodiments are illustrative of the practice of the invention. It is to be understood, therefore, that other expedients known to those skilled in the art or disclosed herein may be employed without departing from the invention or the scope of the appended claims. For example, the present invention is not limited to covers that are rectangular or to covers that are planar. The present invention further includes within its scope methods using the invention described hereinabove.

What is claimed is:

1. A cover for use in covering an open side of a container portion for an electrochemical cell, the cover comprising:
   a main body portion;
   a feedthrough ferrule portion defining a passage through the cover;
   a fillport portion defining a passage through the cover, wherein at least one of the feedthrough ferrule portion and fillport portion is metal injection molded with the main body portion and is completely integral with the main body portion; and
   one or more spacers positioned about a peripheral edge of the main body portion, the one or more spacers being completely integral with the main body portion.

2. The cover according to claim 1, wherein both of the feedthrough ferrule portion and the fillport portion are completely integral with the main body portion.

3. The cover according to claim 1, wherein the feedthrough ferrule portion is completely integral with the main body portion, and further wherein the feedthrough ferrule portion includes a tubular member extending from a major lateral surface of the main body portion.

4. The cover according to claim 1, wherein the fillport portion is completely integral with the main body portion, and further wherein the fillport portion includes a tubular member extending from a major lateral surface of the main body portion, the tubular member having a conical outer surface that is generally wider proximate the main body portion and which tapers as the tubular member extends away from the main body portion.

5. The cover according to claim 1, further comprising a depression defined in the main body portion.

6. The cover according to claim 1, wherein the depression is a lead socket.

7. The cover according to claim 5, wherein the depression is a weld groove.

8. The cover according to claim 5, wherein the weld groove is defined at a distance from a peripheral edge of the main body portion.

9. The cover according to claim 7, wherein the fillport portion includes an opening sized for accepting a closure button, the weld groove defined at a distance about the opening.

10. A cover for use in covering an open side of a container portion for an electrochemical cell, the cover comprising:
    a main body portion;
    a feedthrough ferrule portion defining a passage through the cover;
    a fillport portion defining a passage through the cover, wherein at least one of the feedthrough ferrule portion and fillport portion is metal injection molded with the main body portion and is completely integral with the main body portion
    a projection extending from the main body portion, the projection being completely integral with the main body portion, wherein the projection is a heat sink projection.

11. The cover according to claim 10, wherein the projection is a weld structure for use in welding a lead thereto.

12. The cover according to claim 1, wherein the main body portion includes a peripheral edge surface joining a major lateral surface at a lead in radiused corner.

13. The cover according to claim 1, wherein the main body portion includes a peripheral edge surface joining a major lateral surface at an angled lead in corner.

14. The cover according to claim 1, wherein the main body portion includes a peripheral edge surface and a major lateral surface adjoined at a stepped corner portion, the stepped corner including a first surface generally perpendicular to a second surface, wherein the first surface is sized for abutting to a peripheral edge of the container portion.

15. A cover for covering an open side of a container portion of an electrochemical cell, the over comprising:
    a main body portion;
    a feedthrough ferrule portion defining a passage through the cover for allowing an electrical lead to pass through the cover, the feedthrough ferrule portion being metal injection molded with the main body portion resulting in the feedthrough ferrule portion being completely integral with the main body portion; and
    spacer means for centering the cover in the opening of the container shell, the spacing means being integrally molded with the main body portion.

16. A cover for covering an open side of a container portion of an electrochemical cell, the cover comprising:
    a main body portion;
    a fillport portion defining a passage through the cover for allowing material to be poured therethrough, wherein the fillport portion metal injection molded with the main body portion resulting in the fillport portion being completely integral with the main body portion; and
    spacer means for centering the cover in the opening of the container shell, the spacing means being integrally molded with the main body portion.

17. A cover for an electrochemical cell, the cover comprising:
    a main body portion for substantially covering an open side of a container shell;
    means for defining a first passage through the cover for allowing an electrical lead to pass through the cover, said first passage defining means includes a tubular member extending from and metal injection molded integrally with the main body portion; and means for defining a second passage through the cover for allowing a material to be poured into the cell, the second passage defining means including a second tubular member having a conical outer surface metal injection molded integrally with the main body portion; and spacer means for centering the cover in the opening of the container shell, the spacing means being integrally molded with the main body portion.

18. The cover according to claim 17, further comprising weld groove means defined into the main body portion for enhancing the welding of the cover to other elements of the cell.

19. The cover according to claim 17, further comprising heat sink means for dissipation of heat integrally molded with the main body portion.

20. The cover according to claim 17, further comprising weld projection means for enhancing a weld of a lead to the cover.

21. A housing for an electrochemical cell, comprising:

a container portion defining an open side; and a cover portion for covering the open side such that the cover portion and the container portion define and enclose a cell cavity, the cover portion including:
a main body portion;
a feedthrough ferrule portion defining a first passage through the cover portion for allowing an electrical lead to pass through the cover portion;
a fillport portion defining a second passage through the cover portion for allowing material to be poured into the cell cavity, at least one of the feedthrough ferrule portion and fillport portion is completely integral with the main body portion; and one or more spacers positioned about a peripheral edge of the main body portion, the one or more spacers being completely integral with the main body portion.

22. An electrochemical cell, comprising:

a housing of electrically conductive material, the housing comprising:
a container portion defining an opening;
a cover portion for closing the opening such that the cover portion and container portion enclose a cell cavity, the cover portion comprising:
a main body portion,
a feedthrough ferrule portion defining a first passage through the cover portion for allowing an electrical lead to pass through the cover portion, and
a fillport portion defining a second passage through the cover portion for allowing cathode material to be poured into the cell cavity, at least one of the feedthrough ferrule portion and fillport portion being integrally molded with the main body portion;
a cathode/anode assembly contained in the housing and insulated from electrical contact therewith, the cathode/anode assembly including at least an electrical lead passing through the first passage; and
heat sink means for dissipation of heat integrally molded with the main body portion.

* * * * *